United States Patent [19]
Tonkin

[11] Patent Number: 6,134,568
[45] Date of Patent: Oct. 17, 2000

[54] PREVIEWING AN ASSEMBLED DOCUMENT

[75] Inventor: Robert Tonkin, Ventura, Calif.

[73] Assignee: Kinko's Ventures, Inc., Ventura, Calif.

[21] Appl. No.: 09/183,759

[22] Filed: Oct. 30, 1998

[51] Int. Cl.[7] .................................................. G06F 17/21
[52] U.S. Cl. ............................................................ 707/526
[58] Field of Search .................................. 707/526, 527, 707/530, 500, 501, 513; 709/200, 201, 202, 203, 217, 219, 238, 239, 243, 244

[56] References Cited

U.S. PATENT DOCUMENTS

| | | | |
|---|---|---|---|
| 4,740,814 | 4/1988 | Folkins ...................................... | 399/15 |
| 4,839,829 | 6/1989 | Freedman ................................ | 364/519 |
| 5,109,252 | 4/1992 | Schott, Jr. ................................ | 399/83 |
| 5,235,680 | 8/1993 | Bijnagte .................................... | 707/10 |
| 5,563,999 | 10/1996 | Yaksich et al. .......................... | 707/507 |
| 5,732,403 | 3/1998 | Nakamura ................................ | 707/514 |
| 5,845,302 | 12/1998 | Cyman, Jr. et al. ...................... | 707/517 |
| 5,923,013 | 7/1999 | Suzuki et al. ............................. | 235/375 |
| 6,006,242 | 12/1999 | Poole et al. ............................... | 707/531 |

OTHER PUBLICATIONS

Lahey et al, "Technique for Inserting Tab Pages into Print–on–Demand System Advanced Function Printing Printer", IBM Technical Disclosure Bulletin, vol. 38, No. 10, pp. 201–202, Oct. 1995.

Mimeo.Com, Inc., "Company Information", printout of http://www.mimeo.com/aboutUs/companyInfo.htm, May 2000.

"Postscript, PDF, and Publishing: the View from New York", Seybold Report on Publishing Systems, vol. 26, No. 16, p. 3(43), May 1997.

Okada et al, "Beyond Book Media: BookWindow", Journal of the Information Processing Studies Association, vol. 35, No. 3, pp. 2, 9–15, 1994.

Mar. 20, 2000 Printout of web page at http://www.mimeo.com.

Mar. 20, 2000 Printout of web page at http://www.mimeo.com/tour/tour.htm.

Mar. 20, 2000 Printout of web page at http://www.mimeo.com/tour/tour1.htm.

Mar. 20, 2000 Printout of web page at http://www.mimeo.com/tour/tour2.htm.

Mar. 20, 2000 Printout of web page at http://www.mimeo.com/tour/tour3.htm.

(List continued on next page.)

Primary Examiner—Joseph H. Feild
Assistant Examiner—Robert D. Bourque
Attorney, Agent, or Firm—Mitchell, Silberberg & Knupp LLP

[57] ABSTRACT

A system which enables a user to preview a document by providing a user interface and inputting, via the user interface, information specifying an arrangement of components to create the document, the components including at least two of: a printed page, a tab page, a blank page, a front cover, a back cover, and a binding. Digital images of at least some of the components specified by the input information are obtained and an image of the document is generated by combining the digital images of at least some of the components in a manner so as to simulate an appearance of the document were the document to be physically assembled according to the input information. The image of the document is then caused to be displayed. Also, a system which enables a user to preview a document by providing a user interface and inputting information, via the user interface, (1) specifying a source file which contains content for the document, (2) specifying an arrangement of components to create the document, the components including pages to be printed and at least one of: a tab page, a front cover, a back cover, and a binding, and (3) defining the pages to be printed, including information specifying content from the source file to be printed on the pages. An image of the document is then generated and displayed by combining digital images of at least some of the components, in a manner so as to simulate an appearance of the document were the document to be physically assembled according to the input information.

35 Claims, 15 Drawing Sheets

OTHER PUBLICATIONS

Mar. 20, 2000 Printout of web page at http://www.mimeo.com/tour/tour4.htm.

Mar. 20, 2000 Printout of web page at http://www.mimeo.com/tour/tour5.htm.

Sep. 15, 1999 Printout of web page at http://www.jfax.com/um.html.

*Summation Blaze–Integrated Litigation Support Software*, published by Summation Legal Technologies, Inc., Jun. 1998, pp. 7–42 to 7–44.

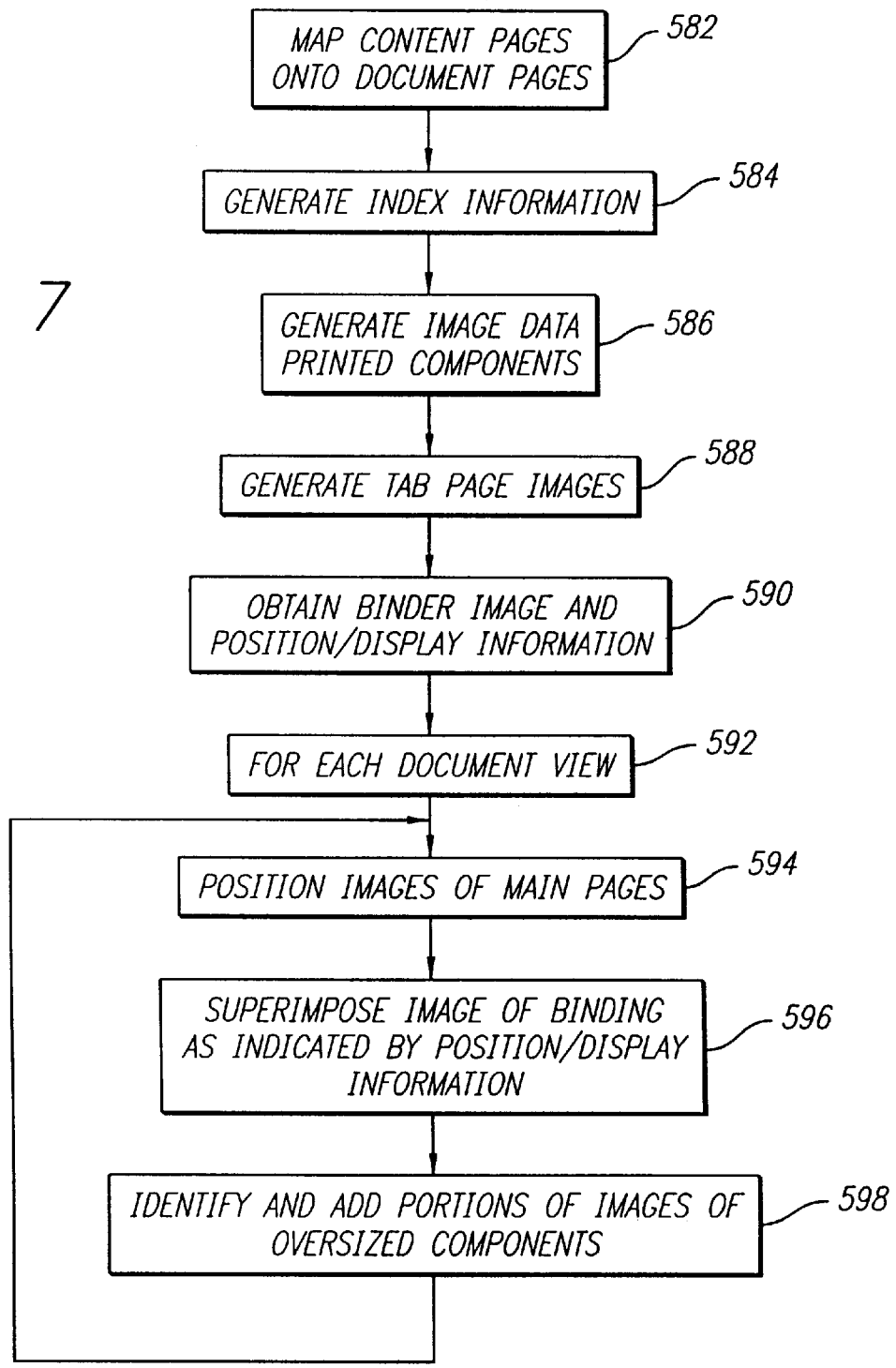

FIG. 9

PREVIEWING AN ASSEMBLED DOCUMENT

BACKGROUND OF THE INVENTION

1. Field of the Invention

The present invention concerns previewing an assembled document, and particularly relates to techniques in which a document can be specified and virtually previewed prior to physical assembly of the document.

2. Description of the Prior Art

The first step in production of a document generally is to create content, such as text and images, to include in the document. The next step is to design the physical appearance of the document, such as by selecting a front cover, back cover, binding type, and one or more tab pages. Lastly, the document is physically created using these assembly instructions, together with the desired content.

In the past, when it was desired to physically create the document, the author was required to physically go either to the copying department in that person's company or to an outside company which provides document production services. Once there, he would provide his detailed document assembly instructions and either a hard copy of the pages he wished to include in the document or a copy of the document in electronic form. In addition to the inconvenience of having to go to a remote location, communicating detailed assembly instructions to the person responsible for physically creating the document often posed another potential problem. Frequently, there were miscommunications or misunderstandings, resulting in a final document which did not appear as the author had intended. In addition, even if the document had been created exactly as the author had intended, upon viewing the final document, the author often was dissatisfied with some aspect of the document appearance.

Thus, in each of these cases, the final document often would have to be disassembled and the required corrections made. This re-working of the document might only require as few as two or three minutes, for example where the changes involved merely substituting several pages in a small document. On the other hand, if the author was dissatisfied, for example, with the color of the paper on which the document was printed or in certain cases with the binding selection, then the entire document generally had to be reprinted and reassembled, resulting in a significant waste of time and resources. The problem was even further exacerbated when the document was large or when many copies of the document had to be corrected.

Several other problems also existed with the conventional methods for ordering a document. For instance, not only was the author required to physically go to a remote location, but upon reaching that location he might then discover that that location did not have the capabilities to produce the document as requested. For example, the facility might not be readily capable of color printing in the volume required by the author. In this case, the author might be redirected to a different location, necessitating even further travel time and inconvenience. Alternatively, the first location could accept the order and then forward it to a different location, such as by telephone or by facsimile. However, in this latter case, the information would have to be re-communicated, increasing the likelihood of the miscommunication and misunderstanding problems mentioned above.

Other problems with the conventional method of ordering a document relate to actual construction of the document. In this regard, in the conventional method the author typically conveyed a set of instructions for creating a document. However, those instructions often were not in the best format for actually creating the document. Therefore, the document assembler often had to go through the instructions and extract information to determine, for example, what types of supplies he would need and what equipment and how much labor will be required to produce the document. Based on this information, he could provide a price quote and an estimated time of completion and either begin working on the order or re-direct it to a more capable facility. However, the foregoing tasks often required a significant amount of time and effort. Moreover, in view of the importance of the information obtained, particular attention to accuracy was required.

Finally, using the conventional method, it was often discovered late in the process that the document could not be assembled as specified by the author. For instance, it might be discovered that the document was too large for the specified binding type. This typically required the document production facility to stop working on the document until the author could be contacted and a substitute binding selected, resulting in additional inconvenience.

SUMMARY OF THE INVENTION

The present invention addresses the foregoing problems by allowing a user to preview a document prior to assembly.

Thus, in one aspect, the invention enables a user to preview a document by providing a user interface and inputting, via the user interface, information specifying an arrangement of components to create the document, the components including at least two of: a printed page, a tab page, a blank page, a front cover, a back cover, and a binding. Digital images of at least some of the components specified by the input information are obtained and an image of the document is generated by combining the digital images of at least some of the components in a manner so as to simulate an appearance of the document were the document to be physically assembled according to the input information. The image of the document is then caused to be displayed.

In a further aspect, the invention enables a user to preview a document by providing a user interface and inputting information, via the user interface, (1) specifying a source file which contains content for the document, (2) specifying an arrangement of components to create the document, the components including pages to be printed and at least one of: a tab page, a front cover, a back cover, and a binding, and (3) defining the pages to be printed, including information specifying content from the source file to be printed on the pages. An image of the document is then generated and displayed by combining digital images of at least some of the components, in a manner so as to simulate an appearance of the document were the document to be physically assembled according to the input information.

By allowing a user to preview a document prior to assembly, the present invention usually can avoid many of the miscommunication problems associated with prior art document ordering techniques. In particular, when both the author and the document assembler can view an image of the assembled document, the likelihood of miscommunication can be significantly reduced.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 7 is a flow diagram illustrating generation of document image data according to a representative embodiment of the invention.

FIG. 9 illustrates reformatted document data to facilitate document assembly and routing according to the preferred embodiment of the invention.

DESCRIPTION OF THE PREFERRED EMBODIMENTS

The following description explains representative embodiments of the invention. While the following embodiments are provided to explain the nature of the invention, it should be understood that the present invention is not limited only to these embodiments.

Operating Environment

Figure 1:
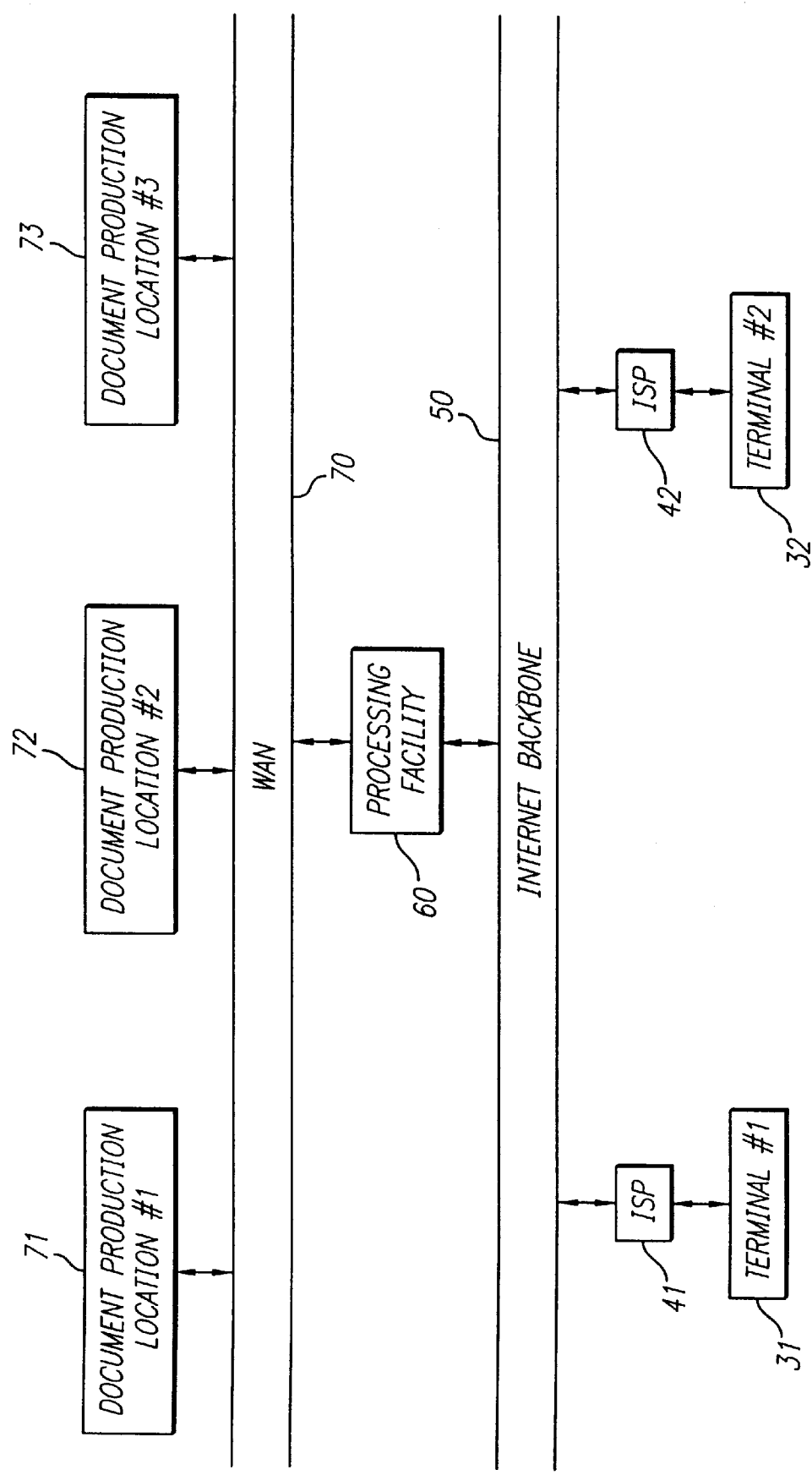
FIG. 1 is a block diagram of an environment in which the present invention can be practiced.

FIG. 1 is a block diagram illustrating the structure of the preferred environment in which the present invention operates. Shown in FIG. 1 are terminals 31 and 32, which may comprise an ordinary computer workstation, a laptop computer, or special-purpose computing equipment. Terminals 31 and 32 communicate with internet service providers (ISPs) 41 and 42 via a telephone connection, such as by using a modem interface. ISPs 41 and 42, in turn, connect to internet backbone 50 via their respective routers (not shown). Specifically, ISP 41 receives internet messages from terminal 31 and then routes them onto internet backbone 50. Also, ISP 41 pulls messages off internet backbone 50 that are addressed to terminal 31 and communicates those messages to terminal 31 via the telephone connection. In a similar manner, terminal 32 also can communicate over the internet through ISP 42.

Also connected to internet backbone 50 is processing facility 60. As discussed in more detail below, one function performed by processing facility 60 is to retrieve document order messages sent over the internet 50, process those orders and then distribute them to one of various document production locations. For this latter purpose, processing facility 60 also is connected to wide area network (WAN) 70. Multiple document production locations, such as locations 71 to 73, also are connected to WAN 70. After determining which document production location should receive a particular order, processing facility 60 routes a message addressed to that document production location onto WAN 70. The respective document production location then retrieves the message off of WAN 70. Generally, each such facility and location will connect to WAN 70 through a router (not shown).

Although terminals 31 and 32 are shown in FIG. 1 as being attached to processing facility 60 via the internet 50, other methods can also be used for communicating between remote terminals and the processing facility, such as by utilizing a direct modem/telephone line dial-in connection, a wide area network, a local area network or any other communication system. Furthermore, different terminals may be connected to processing facility 60 via different communication systems. For example, individual computer workstations might connect to processing facility 60 via the internet 50, while terminals under common ownership with processing facility 60 might communicate with processing facility 60 via a WAN or a direct dial-in connection. Similarly, although processing facility 60 is shown in FIG. 1 as being connected to the various document production locations using WAN 70, any other communication system may also (or instead) be used, such as a wide area network, local area network, internet, or direct modem/telephone line dial-in connection.

Figure 2:
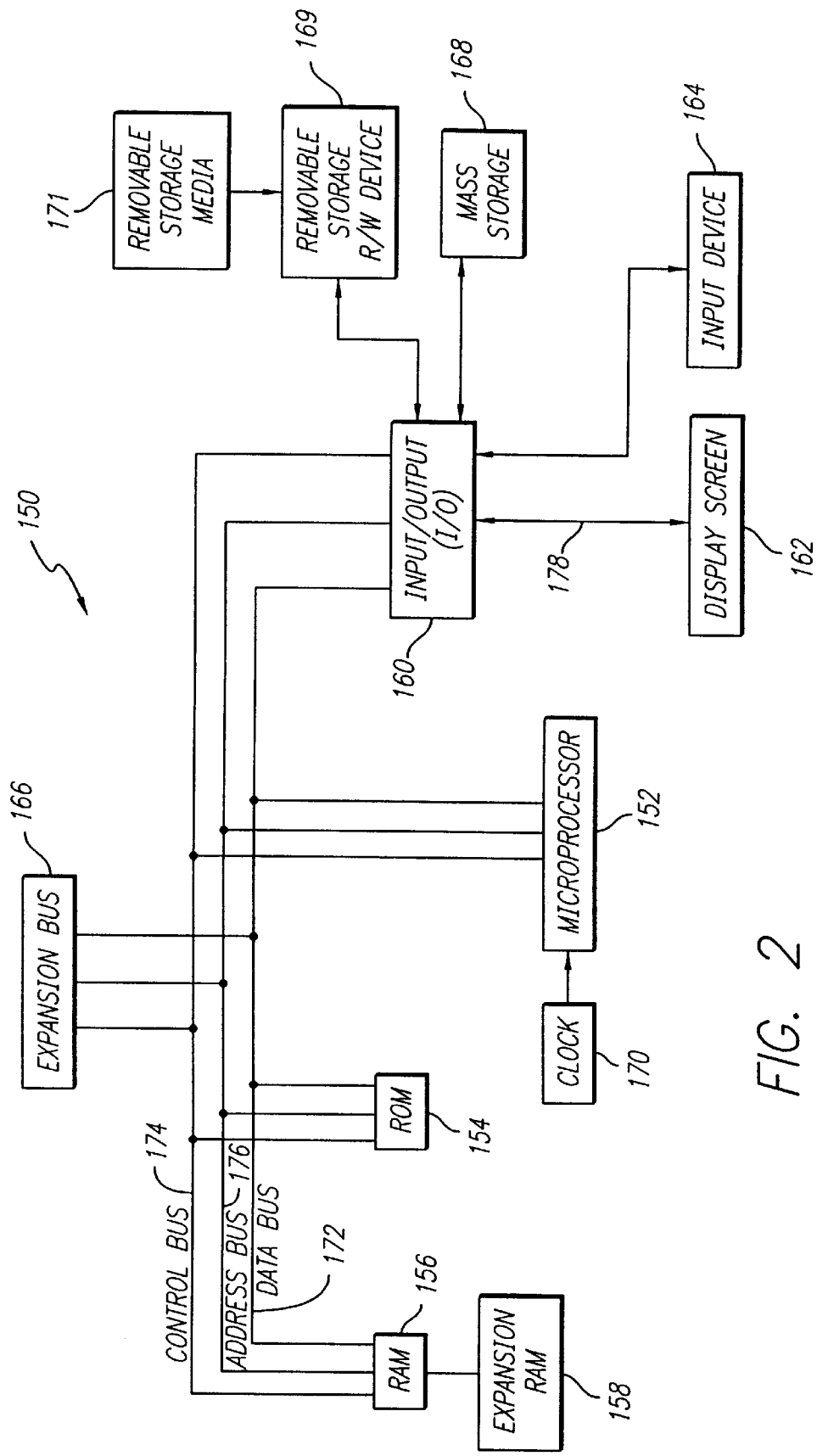
FIG. 2 is a block diagram of a general purpose computer system, representing one suitable computer platform for implementing the communication nodes illustrated in FIG. 1.

FIG. 2 illustrates a block diagram of a general purpose computer system which can be used to implement terminals 31 and 32, processing facility 60, and/or document production locations 71 to 73. Specifically, FIG. 2 shows a general purpose computer system 150 for use in practicing the present invention. As shown in FIG. 2, computer system 150 includes a central processing unit (CPU) 152, read-only memory (ROM) 154, random access memory (RAM) 156, expansion RAM 158, input/output (I/O) circuitry 160, display assembly 162, input device 164, and expansion bus 166. Computer system 150 may also optionally include a mass storage unit 168 such as a disk drive unit or nonvolatile memory such as flash memory and a real-time clock 170.

CPU 152 is coupled to ROM 154 by a data bus 172, control bus 174, and address bus 176. ROM 154 contains the basic operating system for the computer system 150. CPU 152 is also connected to RAM 156 by busses 172, 174, and 176. Expansion RAM 158 is optionally coupled to RAM 156 for use by CPU 152. CPU 152 is also coupled to the I/O circuitry 160 by data bus 172, control bus 174, and address bus 176 to permit data transfers with peripheral devices.

I/O circuitry 160 typically includes a number of latches, registers and direct memory access (DMA) controllers. The purpose of I/O circuitry 160 is to provide an interface between CPU 152 and such peripheral devices as display assembly 162, input device 164, and mass storage 168.

Display assembly 162 of computer system 150 is an output device coupled to I/O circuitry 160 by a data bus 178. Display assembly 162 receives data from I/O circuitry 160 via bus 178 and displays that data on a suitable screen.

The screen for display assembly 162 can be a device that uses a cathode-ray tube (CRT), liquid crystal display (LCD), or the like, of the types commercially available from a variety of manufacturers. Input device 164 can be a keyboard, a mouse, a stylus working in cooperation with a position-sensing display, or the like. The aforementioned input devices are available from a variety of vendors and are well known in the art.

Some type of mass storage 168 generally is considered desirable. However, mass storage 168 can be eliminated by providing a sufficient mount of RAM 156 and expansion RAM 158 to store user application programs and data. In that case, RAMs 156 and 158 can optionally be provided with a backup battery to prevent the loss of data even when computer system 150 is turned off. However, it is generally desirable to have some type of long term mass storage 168 such as a commercially available hard disk drive, nonvolatile memory such as flash memory, battery backed RAM, PC-data cards, or the like.

A removable storage read/write device 169 may be coupled to I/O circuitry 160 to read from and to write to a removable storage media 171. Removable storage media 171 may represent, for example, a magnetic disk, a magnetic tape, an opto-magnetic disk, an optical disk, or the like.

In operation, information is input into the computer system 150 by typing on a keyboard, manipulating a mouse or trackball, or "writing" on a tablet or on position-sensing screen of display assembly 162. CPU 152 then processes the data under control of an operating system and an application program, such as a program to perform steps of the inventive method described above, stored in ROM 154 and/or RAM 156. CPU 152 then typically produces data which is output to the display assembly 162 to produce appropriate images on its screen.

Expansion bus 166 is coupled to data bus 172, control bus 174, and address bus 176. Expansion bus 166 provides extra ports to couple devices such as network interface circuits, modems, display switches, microphones, speakers, etc. to CPU 152. Network communication is accomplished through the network interface circuit and an appropriate network.

Suitable computers for use in implementing the present invention may be obtained from various vendors. Various computers, however, may be used depending upon the size and complexity of the required tasks. Suitable computers include mainframe computers, multiprocessor computers, workstations or personal computers. In addition, although a general purpose computer system has been described above, a special-purpose computer may also (or instead) be used at the document production locations, processing facility and/or remote terminals.

System Overview

Figure 3:
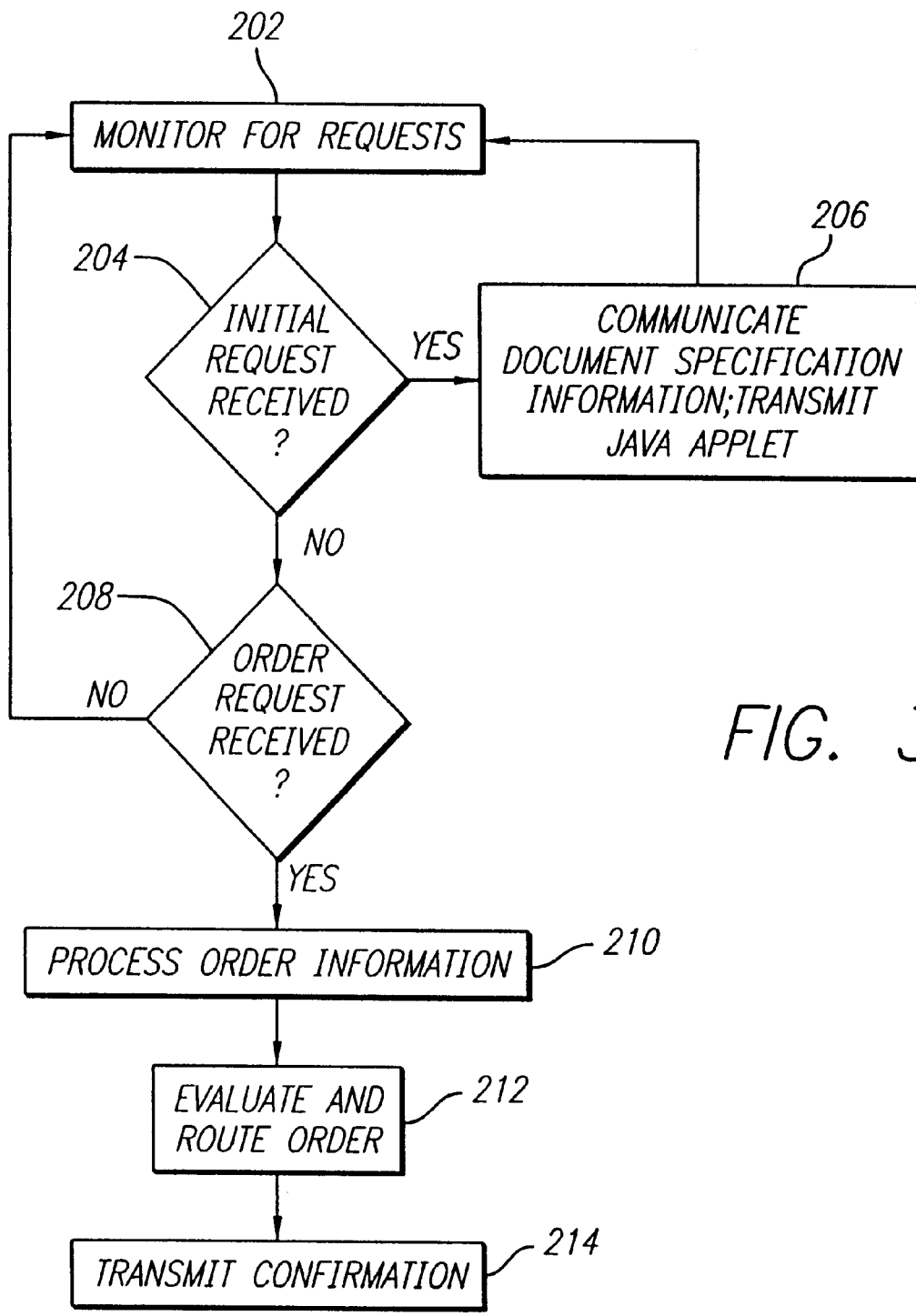
FIG. 3 is a flow diagram illustrating an overview of a system according to a representative embodiment of the invention.

FIG. 3 is a flow diagram illustrating an overview of the processing steps performed according to a representative embodiment of the invention. For example, the process steps illustrated in FIG. 3 can initially be stored on mass storage device 168, downloaded into RAM 156, and then executed by microprocessor 152 out of RAM 156. Briefly, according to FIG. 3, processing facility 16 monitors for requests; communicates document specification information with a remote terminal (client) and transmits a Java applet to the remote terminal if an initial request is received; when an order request is received, processing facility 60 processes the order information, evaluates and routes the order, and then transmits a confirmation message to the requesting terminal.

In more detail, in step 202 processing facility 60 monitors internet traffic for messages directed to it. In this regard, processing facility 60 generally will conduct various communications over the internet with remote terminals. For example, processing facility 60 might receive a request from a remote terminal to view the processing facility's home web page. In response, processing facility 60 will route an IP packet to the requestor which includes an HTML message for displaying its home page. Navigating through the facility's various web pages, beginning with the home page, a remote terminal operator might eventually click on icon requesting initial ordering information. In response, the user's remote terminal, running an internet browser, will generate an IP packet containing a request for such information.

Upon receiving that request in step 204, processing facility 60 sends a response message in step 206. Preferably, the response message includes HTML code to create an initial document creation window and a Java applet which can be executed on a remote terminal to enable a user to preview a specified document. A more detailed explanation of such communication and the functioning of the Java applet in this embodiment of the invention is described below.

When such an order request is received in step 208 by the processing facility 60, processing proceeds to step 210. In step 210, the received order information is processed to format the information so as to facilitate assembly of the document and also to facilitate routing of the order information. In step 212, the order information is evaluated and a document production location is selected to process the order. The document specification is then routed via WAN 70 to that document production location. Finally, in step 214 an order confirmation is transmitted from processing facility 60 to the requesting terminal. Steps 210, 212 and 214 are discussed in more detail below.

Document Specification, Previewing and Ordering

Figure 4:
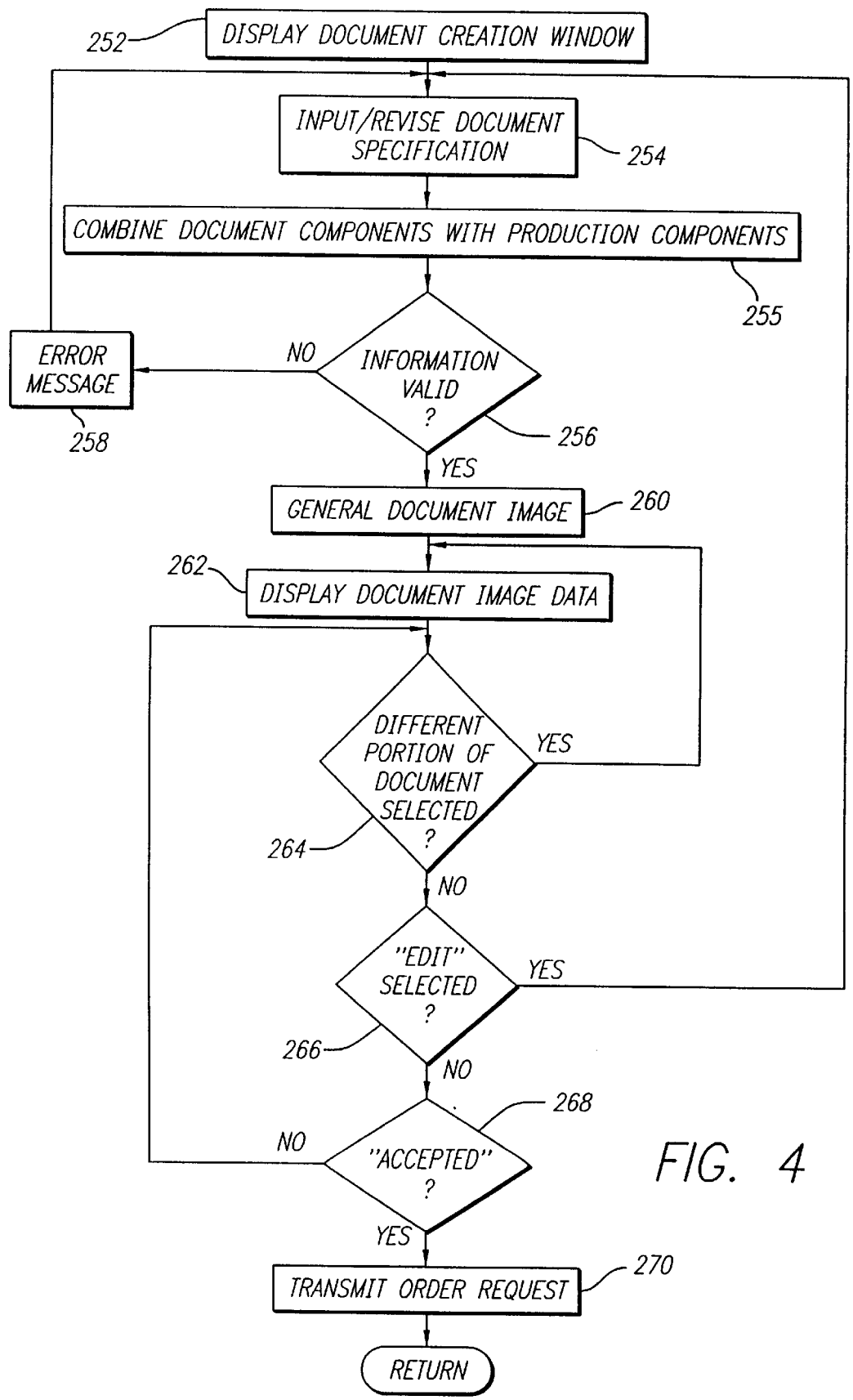
FIG. 4 is a flow diagram illustrating document specification, previewing and ordering according to a representative embodiment of the invention.

FIG. 4 illustrates process steps executed to enable a user to specify assembly instructions for a document, preview the document as assembled and order the document according to the present embodiment of the invention. Briefly, according to FIG. 4, a document creation window is displayed; information is input specifying the arrangement of the document; upon user designation that the document specification is ready, the information is tested to determine whether it is valid; if not valid, an error message is displayed and the document specification can be revised; if the document specification is valid, a document image is generated and displayed; upon the user's selection of a different portion of the document, a new image corresponding to that portion of the document is displayed; upon the user's selection of an "edit" button, a window is displayed allowing the user to revise the document specification; upon the user's acceptance of the document specification, an order request including the document specification is transmitted to processing facility 60.

In more detail, in step 252 a document creation window is displayed. This is the initial window in defining a new document, and preferably is received from processing facility 60 as a web page.

In step 254, information regarding the document structure is input as the user navigates through various windows adding components to the document and defining those components. An example of creating a document and inputting document specification for the document is described below in connection with FIGS. 5A through 5F.

Specifically, FIGS. 5A through 5F illustrate portions of the graphic user interface displayed on a computer monitor to allow a user to create a document and then to input and modify the document specification for creating the document, in the preferred embodiment of the invention. Typically, a user enters information via such a graphic user interface by entering information in various displayed fields and selecting displayed items using a computer keyboard and/or a pointing device, such as a computer mouse. Construction of such user interfaces is well known in the art. As noted above, in the present embodiment, the various pages of the graphic user interface are provided from processing facility 60, preferably as HTML coded web pages.

Figure 5A:
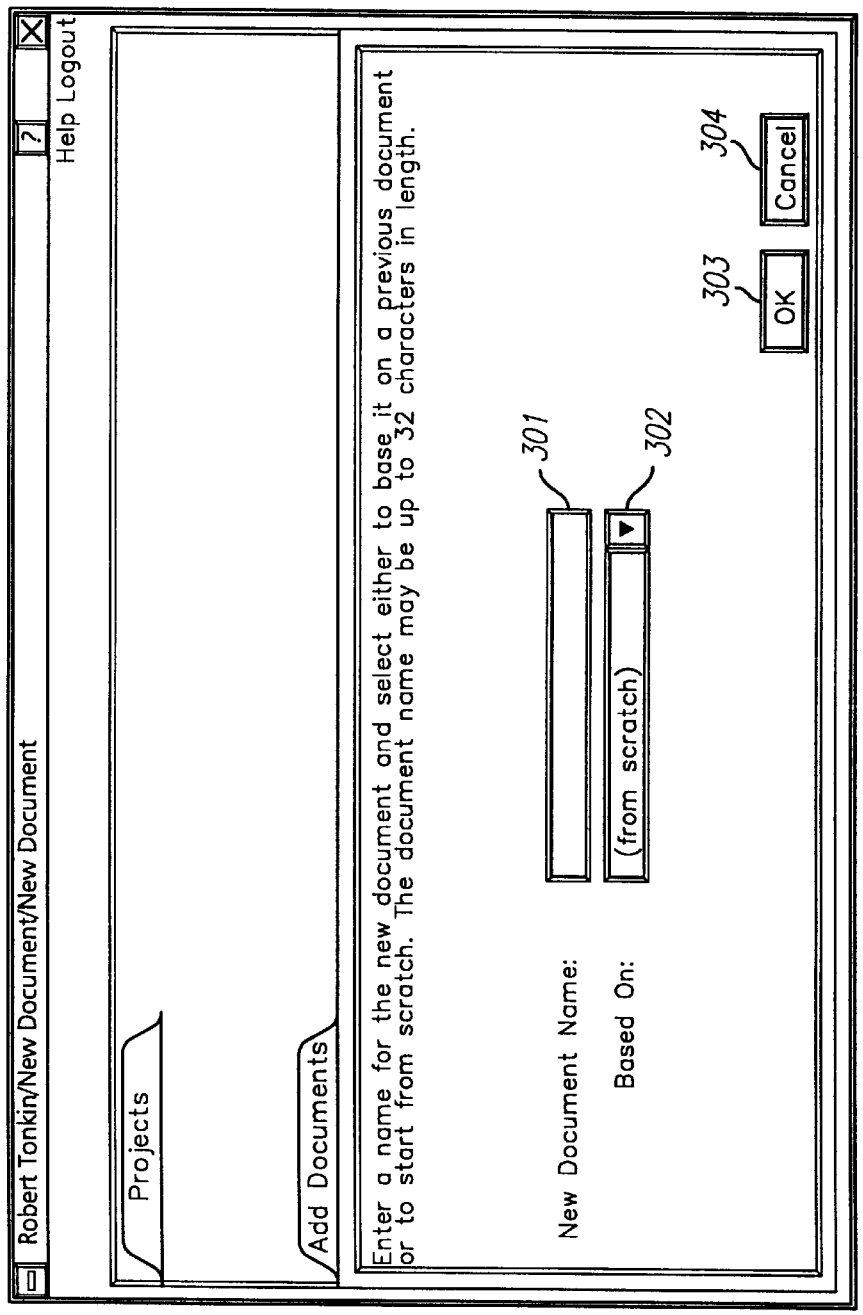
FIGS. 5A through 5F illustrate windows in a graphic user interface which can be displayed on one of the terminals shown in FIG. 1 for use in constructing, previewing and ordering a document according to the present invention.

The initial document creation window 300 utilized in the present embodiment of the invention is illustrated in FIG. 5A. As indicated above, this window is displayed in step 252. As shown in FIG. 5A, the initial document creation window 300 includes a field for the user to enter a new document name 301 and a field 302 for the user to indicate whether the document is being built from scratch or is based on another document. If based on another document, the new document initially will have all the characteristics of the "based on" document. That is, those characteristics are merely copied over from the stored existing document. In further steps, the user can then modify that information as desired. Clicking on "OK" button 303 brings up main editing window 310, shown in FIG. 5B, while clicking on "Cancel" button 344 deletes the entered information.

Figure 5B:
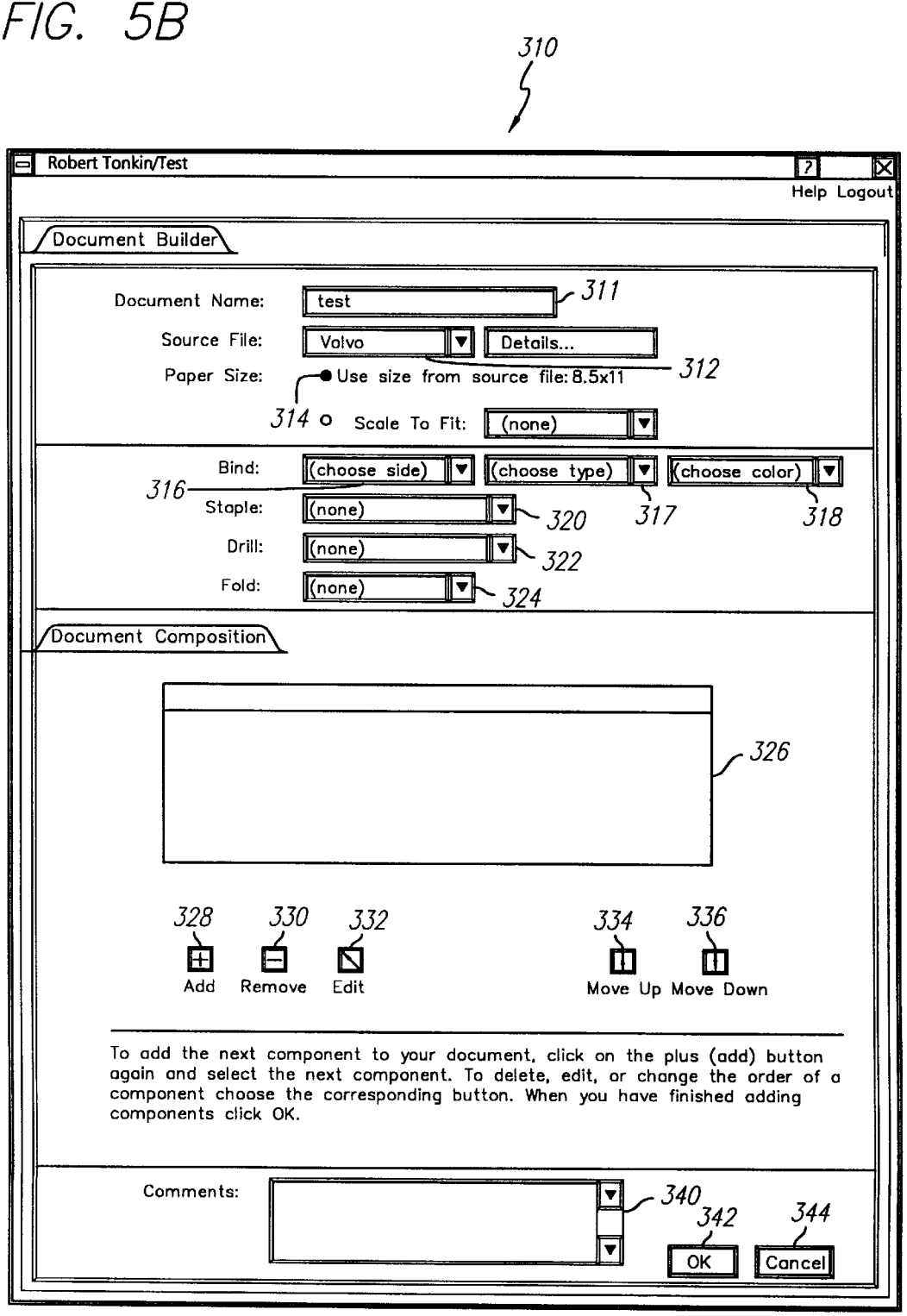

FIG. 5B illustrates the main document editing window 310. In the present embodiment of the invention, this is the first window opened in step 254. As seen in FIG. 5B, a field 311 is displayed and includes the document name entered by the user in field 301 of document creation window 300. In field 312, the user enters a source file which includes the content to be included in the document. Preferably, the source file is in portable document format (PDF). However, the present invention can be configured so as to accept source files in other formats, such as word processing documents, spreadsheet documents and compound documents. If such other formats are in fact allowed, it is preferable to first convert them into a portable document format, so as to enable the user to view the document content as it will actually be printed. This will enable the user to verify that page breaks and other formatting details will be as expected.

Also included in main document editing window 310 are radio buttons 314 for the user to select paper size. Specifically, the user can elect to use the paper size indicated in the source file, in which case the paper size specified in the source file will be detected automatically. Alternatively, the user can select a different paper size, in which case the content automatically will be scaled to fit the selected paper size. Although the present embodiment utilizes only a single paper size, it is noted that the invention is not so limited, and other embodiments of the invention may include more than a single paper size in the document.

Fields 316, 317 and 318 allow a user to specify the side which is to be bound (e.g., left side or top side), the type of binding to use (e.g., coil binder, tape binding, perfect binding), and binding color respectively. Clicking on the arrow associated with each field causes a list of options to be displayed for that field. Thus, for example, a user might select a black coil binder to be placed on the left side of the document.

Field 320 allows a user to select staple options, such as none, upper left corner, or top center. It should be noted that while stapling is treated differently than binding in the present embodiment of the invention, in other embodiments stapling might be treated as one type of binding. Field 322 allows the user to specify whether and what types of holes are to be drilled in the document. Field 324 allows the user to specify machine folding of the pages. In each case, clicking on the down arrow causes a list of options to be displayed.

The document composition portion of editing window 310 provides a list 326 of the other document components which have been designated for inclusion within the document, and includes button 328 to add new components, button 330 to remove components, and button 332 to edit a component. Also included are buttons 334 and 336 to navigate up and down, respectively, through list 326. Box 340 permits the user to add comments to the document description.

Figure 5C:
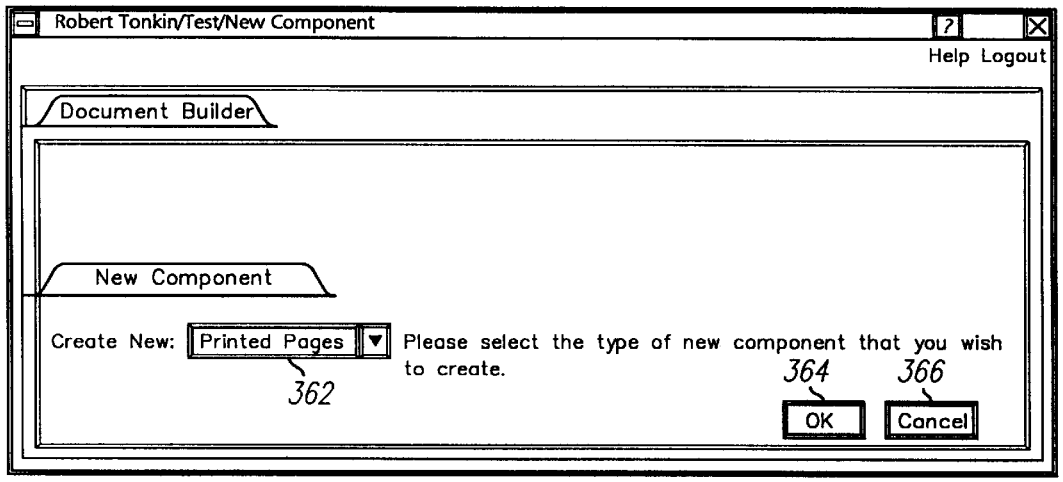
Figure 5D:
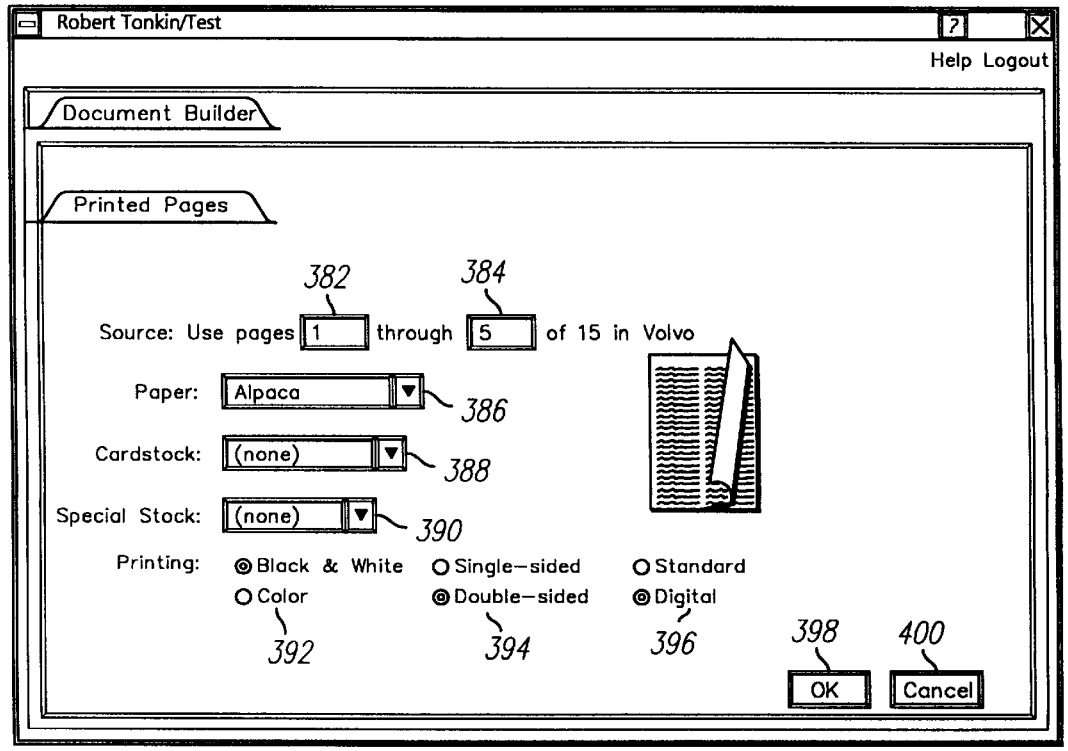

Upon clicking on Add button 328, a new window 360 is displayed, as shown in FIG. 5C. Window 360 includes a field 362 which allows a user to designate what type of new component he would like to create. Clicking on the associated down arrow brings up a list of options, such as front cover, printed pages, tab pages and back cover. After selecting a component to create, the user can click on the "OK" button 364 or "Cancel" button 366. Cancel button 366 returns the user to window 310 (shown in FIG. 5B). On the other hand, clicking on the "OK" button 364 causes the printed pages editing window 380 to be displayed, as shown in FIG. 5D.

Printed pages editing window 380 includes fields 382 and 384 for specifying a range of pages from the source file to be printed. In addition, printed pages editing window 380 includes fields 386, 388 and 390 for specifying the media type on which to print the specified pages. For instance, the user can specify a medium from the paper stock options 386, the card stock options 388, or the special stock options 390 (e.g., transparencies). Clicking on the down arrow button in the associated field brings up a list of options for that medium type.

Printed pages editing window 380 also includes radio buttons 392 for selecting either black and white or color printing, 394 for selecting single-sided or double-sided printing, and 396 for selecting standard or digital printing. Upon completion of the printed pages specification, the user can click on "OK" button 398, in which case the input information is incorporated into the document and the user is returned to main editing window 310. Alternatively, the user may click on cancel button 400, in which case the input information is deleted and the user is returned to new component window 360.

Figure 5E:
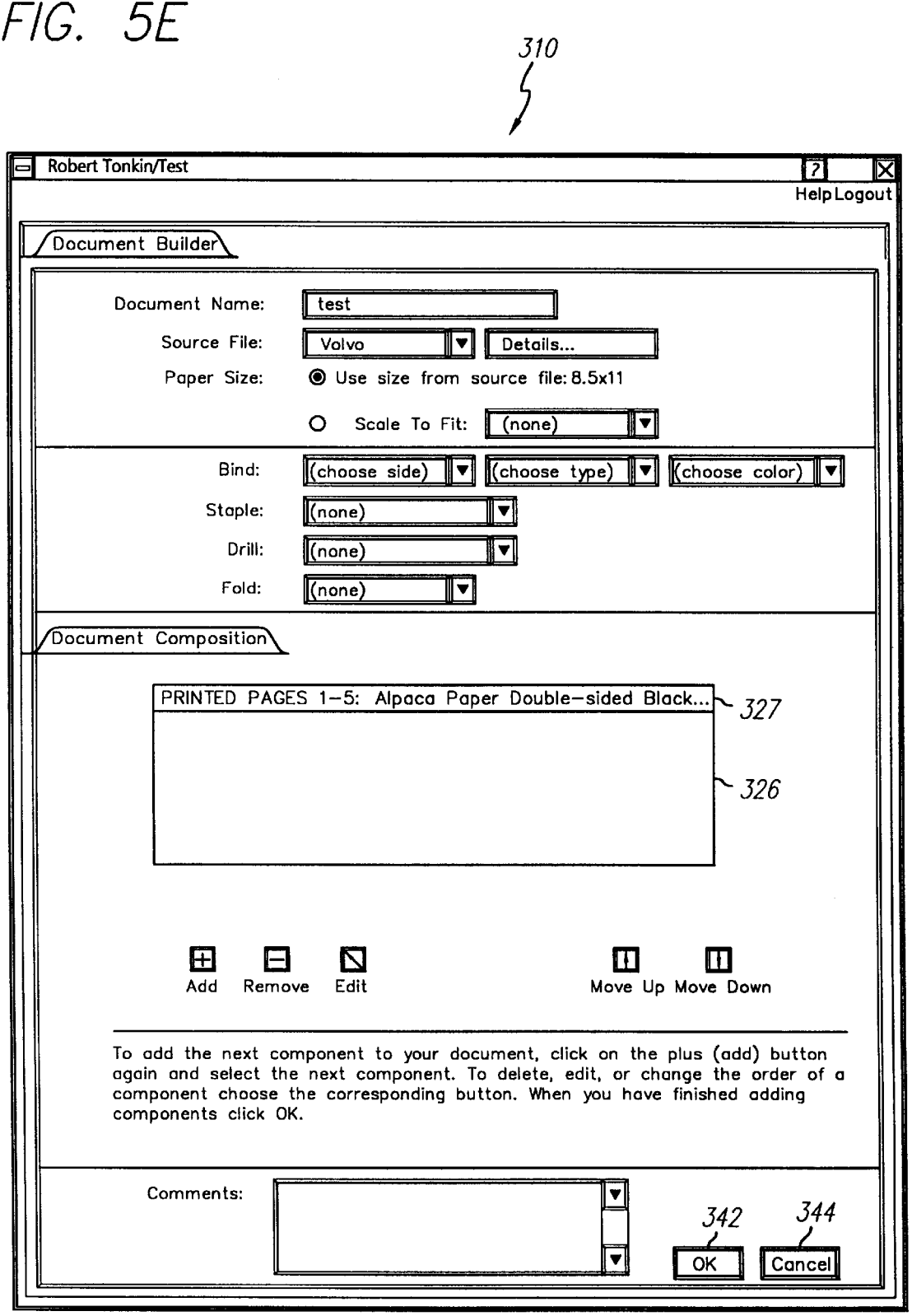

FIG. 5E illustrates the appearance of main editing window 310 after the new "printed pages" component has been added. As seen in FIG. 5E, list 326 in the document composition portion of the window now includes an entry 327 summarizing the features of the new "printed pages" component of the document.

Continuing in this manner, a user can specify new components, remove components, or edit the descriptions of existing components until he is satisfied with the composition of the document.

Figure 5F:
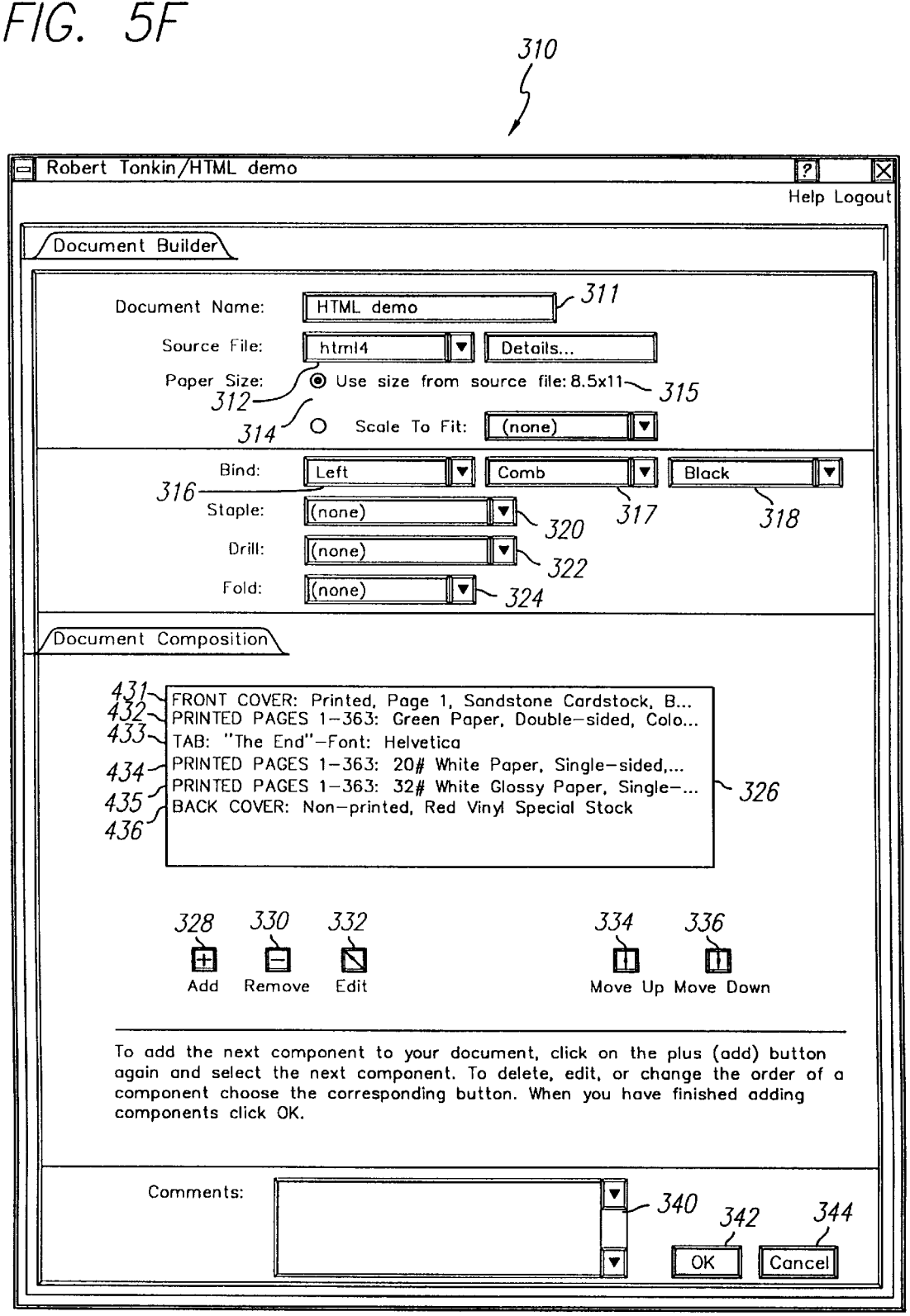

FIG. 5F illustrates the appearance of main editing window 310 after a document composition has been fully specified. As seen in FIG. 5F, the source file is specified as "html4"; the user has selected to use the paper size from the source file, which has been detected as being 8½×11; a black comb binder has been selected and is to be applied to the left side of the document; and the user has selected no stapling, drilling or folding.

Document component list 326 lists a front cover 431, followed by 363 printed pages 432, followed by a tab page 432 with the words "The End" written on the tab in Helvetica font, followed by 363 printed pages 433, followed 363 printed pages 434, followed back cover 435.

Figure 6:
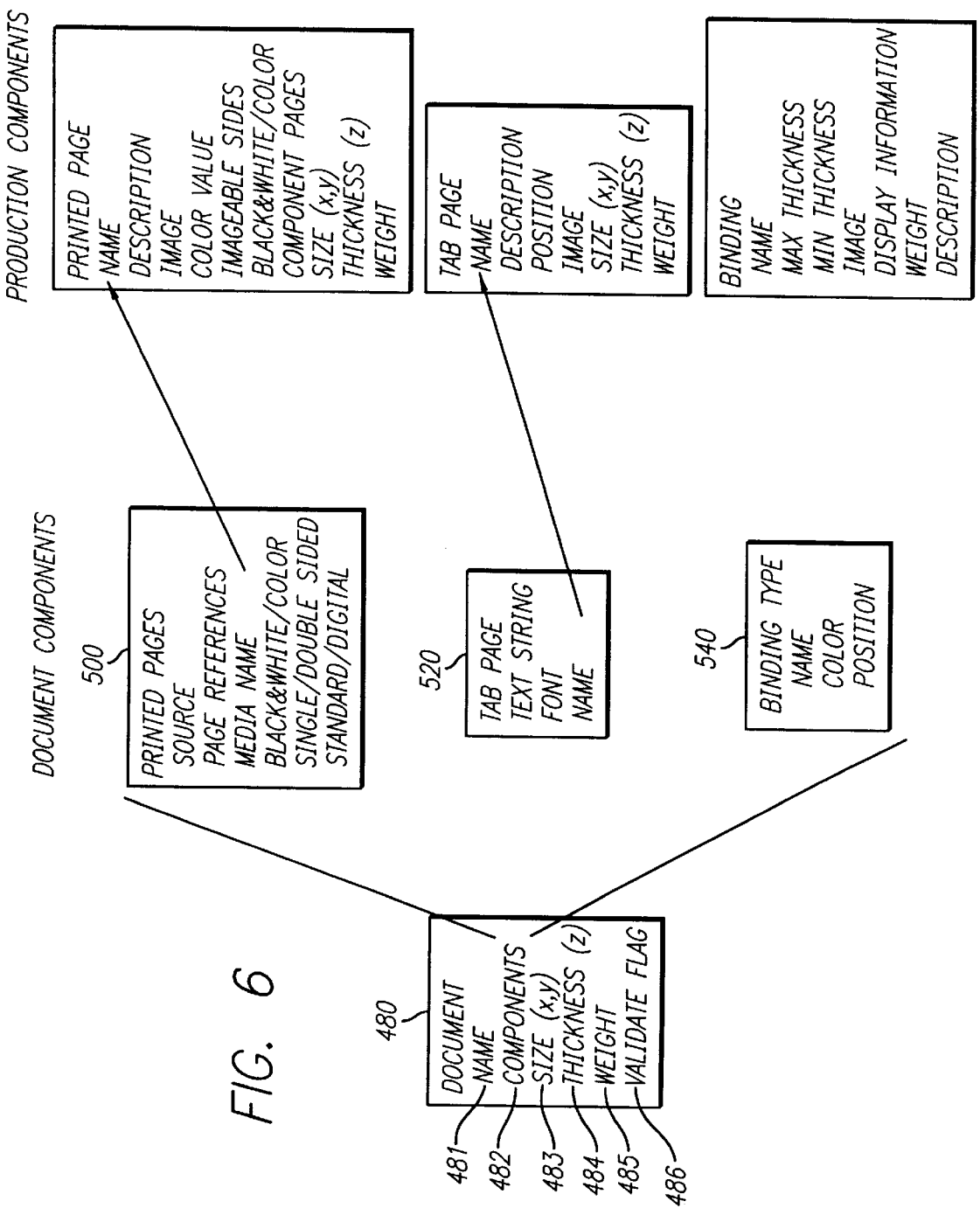
FIG. 6 illustrates one example of a document object and document component sub-objects which can be used in the practice of the present invention.

The data structures used in the present embodiment of the invention will now be described with reference to FIG. 6. When a user creates a new document, an object 480 is created for the document. Each document object 480 has the following attributes: a user-specified name 481, a list of document components 482, size 483 in length and width, thickness 484, weight 485 and validation flag 486.

List of document components 482 preferably includes a list of pointers to sub-objects for the various user-specified components. These sub-objects might include, for example, a printed pages document component 500, a tab page document component 520 and a binder type component 540. Preferably, the attribute values for each such sub-object have been supplied by the user via the graphic user interface.

The size 483, thickness 484, weight 485 and validation flag 486 attributes of document object 480 initially have unspecified values. Their values are assigned as described below.

Also transmitted to the remote terminal in this embodiment of the invention, are production component objects for the production components to be used in the document. Preferably, the production component objects are organized into classes, with each member inheriting attributes from the class to which it belongs. Thus, for example, there might be a "printed page" class, and the members of the class might include 8½×11" transparency and A4 white bond. Similarly, a binder class might include perfect binding and a 1" coil binder. The attributes for each production component object describe physical properties of the component and also include an image of the component. These physical properties include, for example, thickness, size, weight, and various other component-specific properties, such as whether the component can be printed in color or only in black & white (printed pages). The image of each production component preferably is in bitmap format, but also may be stored in any other format and may be either compressed or uncompressed.

If the user has specified a particular component, the document component object corresponding to that component will include a pointer to a production component object for that particular component. This is generally the case for printed pages and tab pages. On the other hand, if the user has merely specified a type of a component to be used, the corresponding document component object preferably will merely include a reference to a class or a sub-class of production components. This will generally be the case for document bindings. In this regard, it is generally preferable to allow the user to specify a type of binding and allow the software to select a specific binding of that type based on properties, such as thickness, of the final document. Such a selection process is described below.

When the document specification has been completed, the user indicates that the document specification is ready. In the present embodiment, this is accomplished by clicking on "OK" button 342 (shown in FIG. 5F) of the main document editing window 310.

Returning to FIG. 4, upon receiving an indication that the document specification is ready, processing proceeds from step 254 to step 255. In step 255, the document component objects are combined with the production component objects. Combining these objects results in: (1) determination of values for the remaining document attributes 483 to 486 and (2) selection of specific production components for those cases where the user has merely specified a component type.

With regard to the former, document size, thickness and weight can easily be determined based on the corresponding properties for the production components and based on the number of each such production component specified by the document object and sub-objects. Specifically, the document thickness generally will be the sum of the thicknesses of each production component used, modified to account for an estimate of the amount of toner required for printing. Similarly, the document weight generally will be the sum of the weights of all the production components used, less the effects of any hole drilling, and then modified to account for an estimate of the amount of toner required for printing. Document size generally will be the maximum size in each dimension of the various production components used to assemble the document. Various other factors may, however, affect the foregoing calculations. For instance, if the user has specified that a particular component is to be folded, then the effects of such folding on size and thickness should be taken into account.

Once the document properties have been calculated, specific production components can be selected for those cases where the user has merely specified a component type. As noted above, it often will be desirable to defer selection of a specific component until certain document properties have been determined. In the present embodiment, the only component for which a type only is specified is the binding. As shown in FIG. 6, each binding component has as attributes the minimum and maximum thicknesses that it can accommodate. Therefore, at this point the number of available bindings can be narrowed to those that are of the type and color specified by the user and that also can accommodate the thickness of the present document. In the event that more than one binding is still available, the binding to be used can be selected from the remaining bindings based on a predetermined rule, such as selecting the smallest binding left. In the event that there are no bindings of the selected type that can accommodate the document, that fact is indicated.

In step 256, it is determined whether the user defined information is valid. Specifically, this step checks whether a document can be physically created as specified and preferably occurs automatically as a result of combining the document component objects and production component objects, as described above. This step determines, for example, whether the user has specified double-sided printing for a media type which is only capable of single-sided printing (e.g., transparency), whether the user has specified color printing for a media type which can only be printed in black and white (e.g., certain card stocks), whether the user has specified a binding type which can not accommodate the document (e.g., because the document is too thick or too thin), or whether the user has specified printing on a media type which cannot be printed (e.g., vinyl).

In the event that the information is invalid, an error message is displayed in step 258, preferably indicating the nature of the error, and then processing proceeds to step 254 to allow the user to revise the document specification. If the document specification is valid, processing proceeds to step 260.

In step 260, image data are generated for the document. In the following discussion, it is assumed that images stored for the production components are in uncompressed bitmap format. If this is not the case, then the image data for each production component preferably is decompressed and/or converted to bitmap format prior to being used, in order to facilitate the processing.

FIG. 7 illustrates a flow diagram for explaining document image data generation according to a representative embodiment of the invention. Briefly, according to FIG. 7, content is mapped from the source file onto document pages; index information is generated, image data are generated for printed image components; image data are generated for tab pages; binder image data and position/display information are obtained; and then an image is generated for each document view by positioning images of the main pages, superimposing an image of the binder, and identifying and adding to the document image certain portions of images of oversized components.

In more detail, in step 582 content pages from the source file are mapped onto document pages. Thus, for example, if a printed pages component specifies source pages 1–100 and double-sided printing, then 50 document pages are defined, with source page 1 being printed on the front side of the first document page in the group, source page 2 being printed on the back side of the first document page in the group, and so on.

In step 584, based on the mapping in step 582, index information is generated linking the document pages to information referenced in the document components.

In step 586, image data are generated for the printed image components of the document. Preferably, this step is performed by retrieving the image data for the production component, converting the content data to bitmap image data as necessary, and combining these bitmap image data to provide a single image. This may require scaling of the content image data either: (1) because the user has specified a different page size than that of the source file, (2) because the images are to be displayed in a reduced size (e.g., thumbnail), or (3) for both reasons. Alternatively, if the content image data has to be converted to bitmap image data, it can be immediately converted to the appropriate size.

Once the two bitmap images are in the same scale, they can be combined on a pixel-by-pixel basis. Preferably, this is done by simply multiplying the respective RGB intensity values (or grayscale intensity values for monochrome images), where the intensity values range between 0 and 1. Thus, if the production component RGB values for a pixel are (1.0, 0.5, 0.5) and the RGB values for a corresponding image pixel in the source file are (0.5, 0, 0.5), then the RGB values for the combined pixel would be (0.5, 0, 0.25). It is noted that other techniques for combining the image data may instead be used. For example, such techniques might reflect color processing that is intended to be performed during document production.

Step 586 is repeated for each document component to be printed with information from the source file. These components might include, for example, printed pages, the front cover, the back cover, and in certain embodiments, tab pages.

In step 588, tab page images are generated. This step is performed for the front of the tab page by obtaining the image of the tab page, rendering the text to be included on the tab to form a bit map image of that text, and superimposing the rendered text image onto the tab in the proper orientation. The back of the tab page can be generated simply by reversing the tab page image in the x dimension.

In step 590, the image of the binding is obtained, together with binding display information from the binding object.

Step 592 begins a loop which is repeated for each document view. Typically, these views will include: the front surface of the front cover, each document open position, and the back surface of the back cover.

In step 594, the images of the main pages for the current view are positioned. Generally, if the document is to be closed in the face-up position (which is the initial image generated in this embodiment of the invention), this will be the front surface of the front cover. If the document is to be in an open position, and assuming the document is bound on the left side, this will involve placing the image of the back side of one page so that its right edge is adjacent to the left edge of the front side of the next succeeding page in the document, with the exact spacing between the page edges specified by the display information associated with the selected binding. For certain types of binding (e.g., perfect binding) there will be little or no spacing between the page edges, while for other types (e.g., coil binding) there will be a noticeable gap between the adjacent page edges. If the document is to be in the closed face-down position, only the back side of the back cover will be positioned.

In step 596, the binding image is superimposed over these document pages based on the display information. Such display information will indicate where the binding is to be placed relative to the document pages in the current view and if it is to be displayed at all. Thus, for tape bound documents, the tape will be shown only if either the front side of the front cover or the back side of the back cover is to be displayed. Similarly, the rings of a three-ring binder will only be displayed if the document is to be in an open position. The display information also will indicate how much the binding is to overlap the page images.

In step 598, oversized components are identified and portions of their images are added to the current display image as necessary. The most common example here is that of a tab page. If a tab page is prior to the current document position, then the back side of the tab (no text) from the tab page will be placed adjacent to the left page image, at the appropriate location. Similarly, if a tab page is subsequent to the current document position, then the front side of the tab (text side) from the tab page will be placed adjacent to the right page image, at the appropriate location. As another example, if a three-ring binder is used, an image of the binder generally will be placed around the displayed pages when the document is to be in the open position.

Figure 8A:
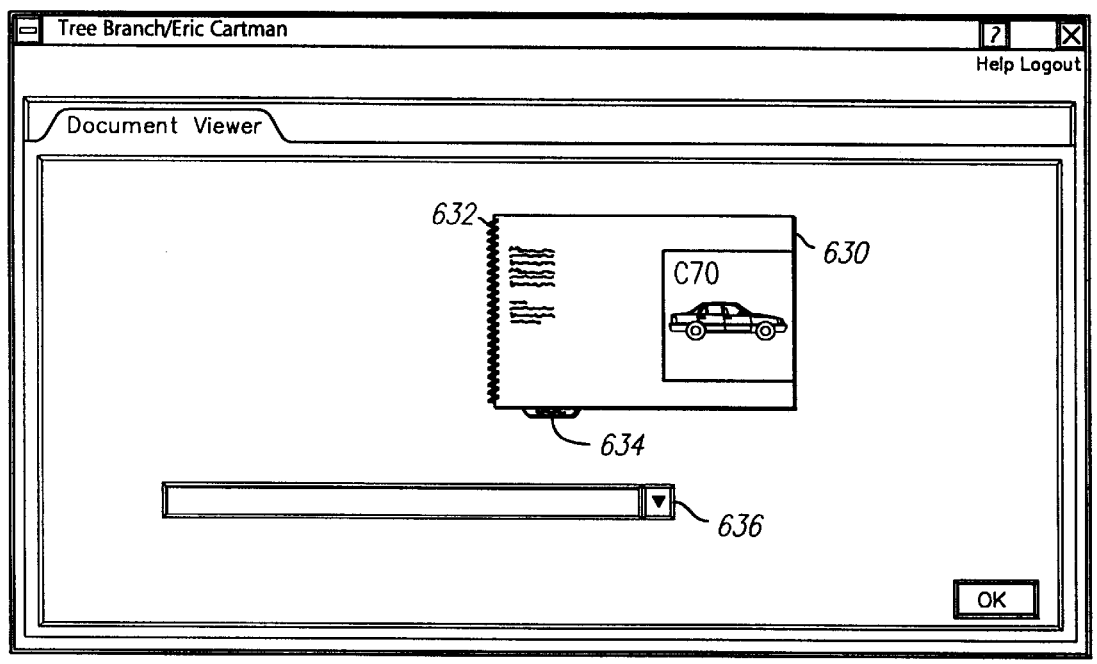
FIGS. 8A through 8E illustrate windows in the graphic user interface for previewing a document according to a representative embodiment of the present invention.

Upon completion of the foregoing loop, image data for each document position will have been generated. Returning now to FIG. 4, in step 262 an image of the document is displayed. In the preferred embodiment, this is the front side of the front cover. An example is the document shown in viewing window 620, in FIG. 8A. As shown in FIG. 8A, the front side of the front cover 630 is displayed, together with an image of the selected binder 632 and the front side 634 of the tab on the tab page included in the document.

Returning to FIG. 4, in step 264 if the user selects a different portion of the document, processing proceeds to step 262 and that portion of the document is displayed.

Figure 8B:
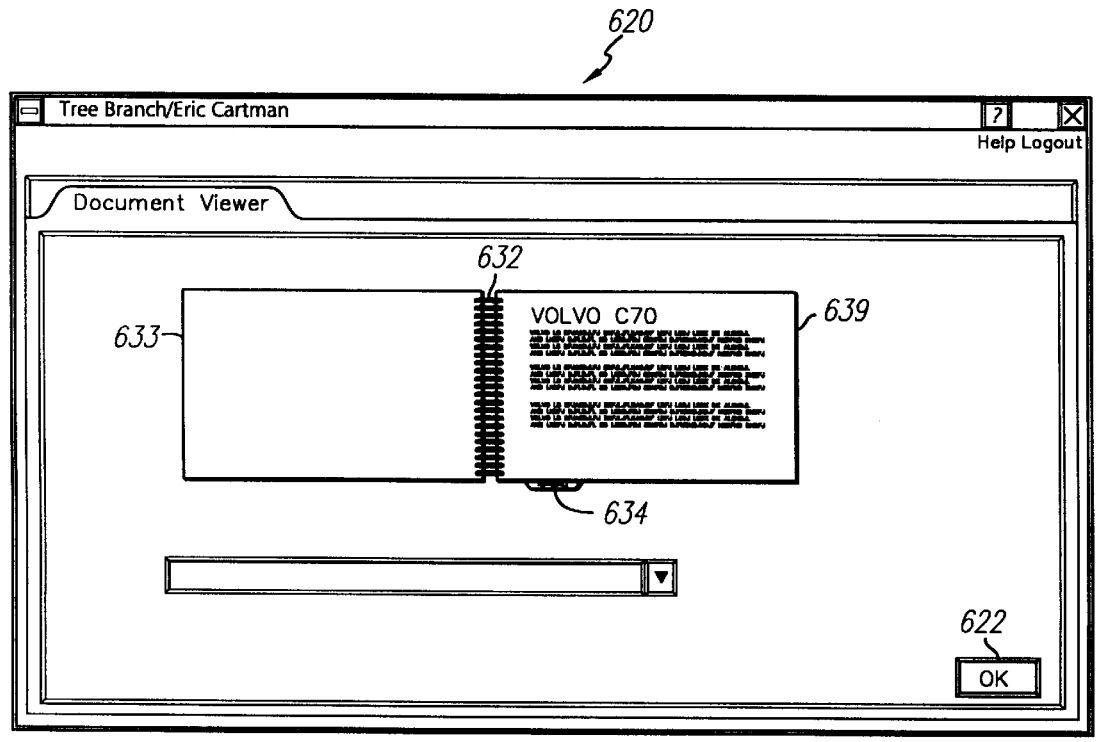

In the preferred embodiment of the invention, document viewing window 620 enables the user to navigate through the document in several different ways. Clicking on the image of the front cover advances to a view of the document as though a single page had been turned in the document. FIG. 8B illustrates the results of this action, in which element 633 is an image of the back side of the front cover and element 639 is an image of the front side of the first page after the front cover. Alternatively, using field 636, the user can select any of the document components and advance immediately to that component. If the user selects a "printed pages" section in this manner, he will be prompted as to which page in the page range he wishes to advance. Using the previously generated index information, the applet will immediately display an image of that page in the document. Finally, the user also can click on tab 634 and, using the index information, the applet will immediately advance to the tab page in the document.

Figure 8C:
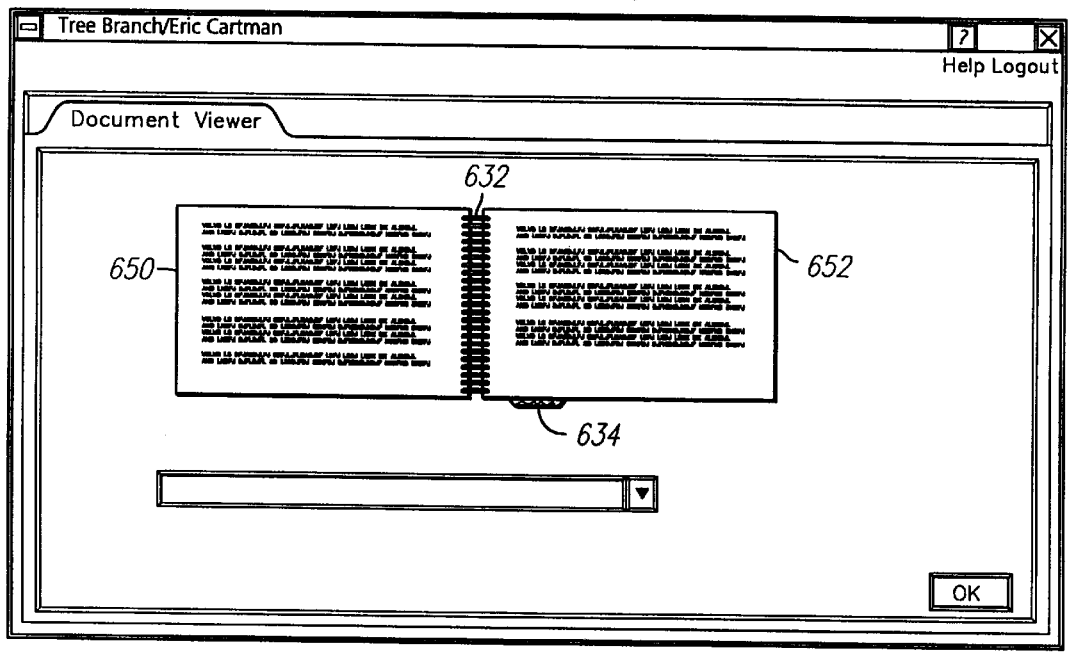
Figure 8D:
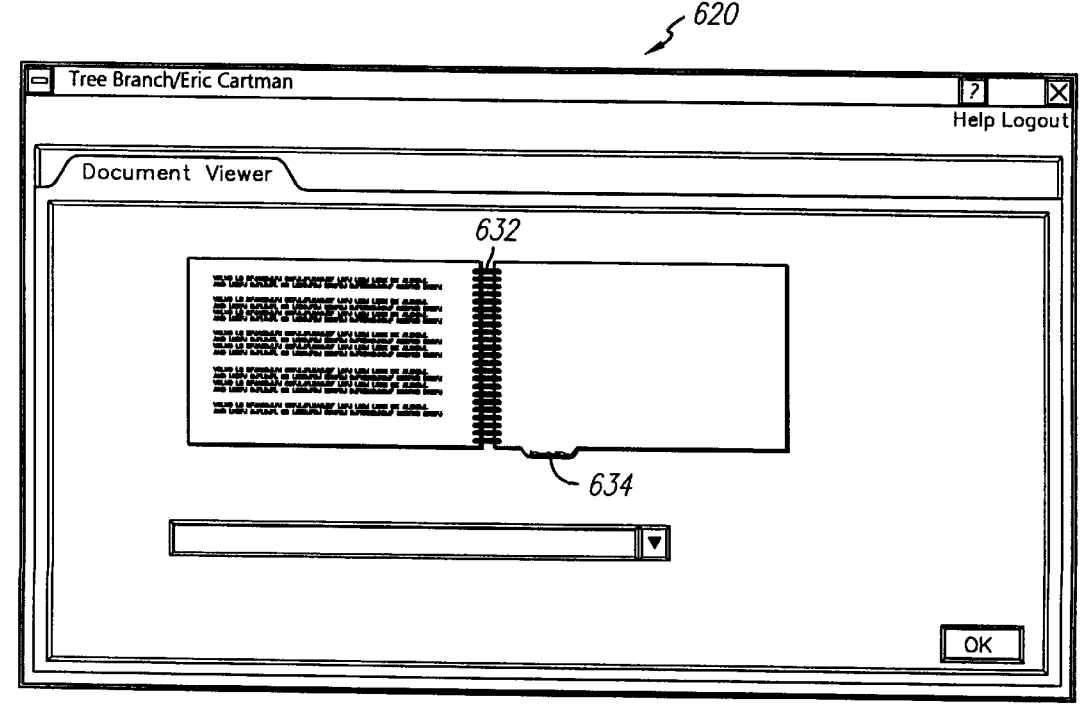

FIG. 8C illustrates an arbitrary open position in the document. From this position the user can click on either the left displayed page 650 to turn back one page or the right displayed page 652 to advance one page in the document. Once again, clicking on tab 634 immediately advances to the tab page. The result of this action is illustrated in FIG. 8D.

Figure 8E:
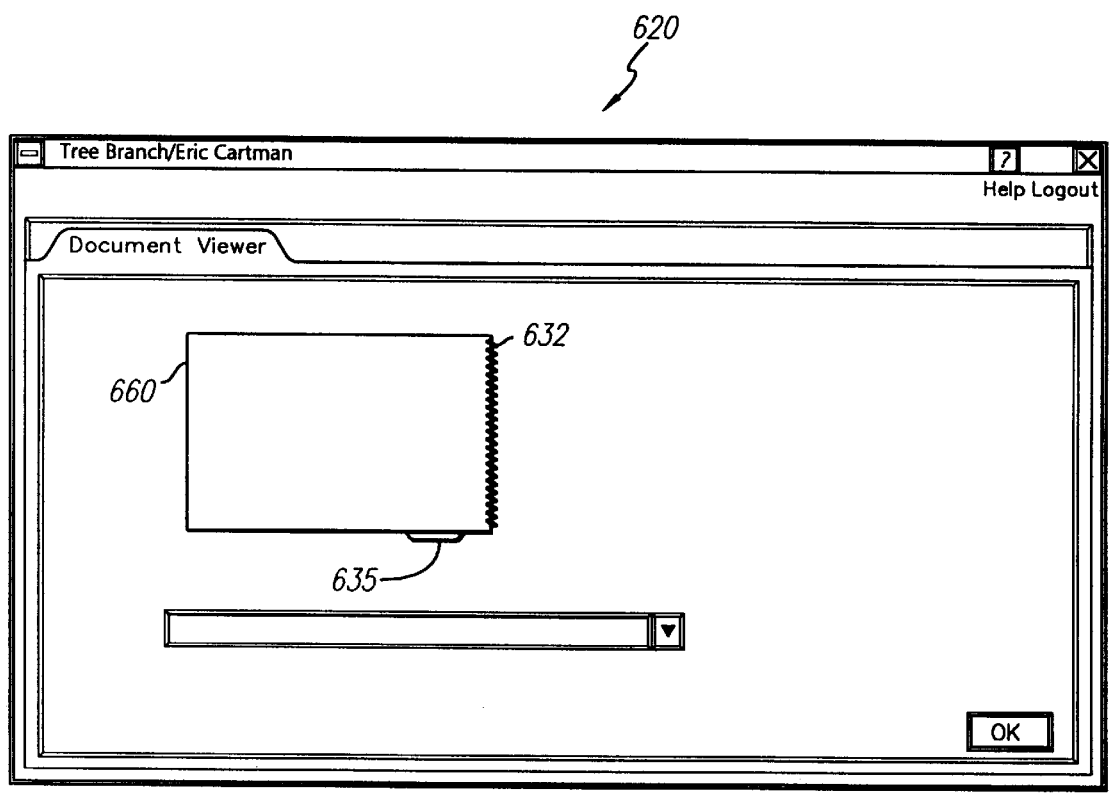

Finally, FIG. 8E illustrates the back side 660 of the back cover of the document. From this view, the binding image 632 is also displayed, together with the back side 635 (no text) of the tab.

It is noted that although certain techniques are used to navigate through the displayed virtual document in the present embodiment of the invention, the invention is not limited to these techniques and any other techniques may also (or instead) be used.

In the present embodiment of the invention, the document specification is generated by communicating over the internet. Specifically, processing facility 60 transmits web pages to the remote terminal. Information input by a user is then submitted to the processing facility. When the user indicates that the document is ready to be displayed, the Java applet received from processing facility 60, running on the remote terminal (client), opens a connection to processing facility 60 in order to download document and production component information, as needed. The Java applet then controls display of the document image according to the above-described user document navigation requests.

Returning again to FIG. 4, in step 266 the user may elect to edit the document specification after having viewed the document images. In this case, processing proceeds to step 254 to display the main document editing window 310.

The user also may "accept" the document in step 268, in which case, in step 270 an order request including the document specification is transmitted to processing facility 60 via the internet or another communication system. Preferably, the order request also includes user identification information which may be input at the time of order or may have been supplied earlier, such as part of an initial login to the processing facility's web page.

Receipt of Order Request

Figure 9:
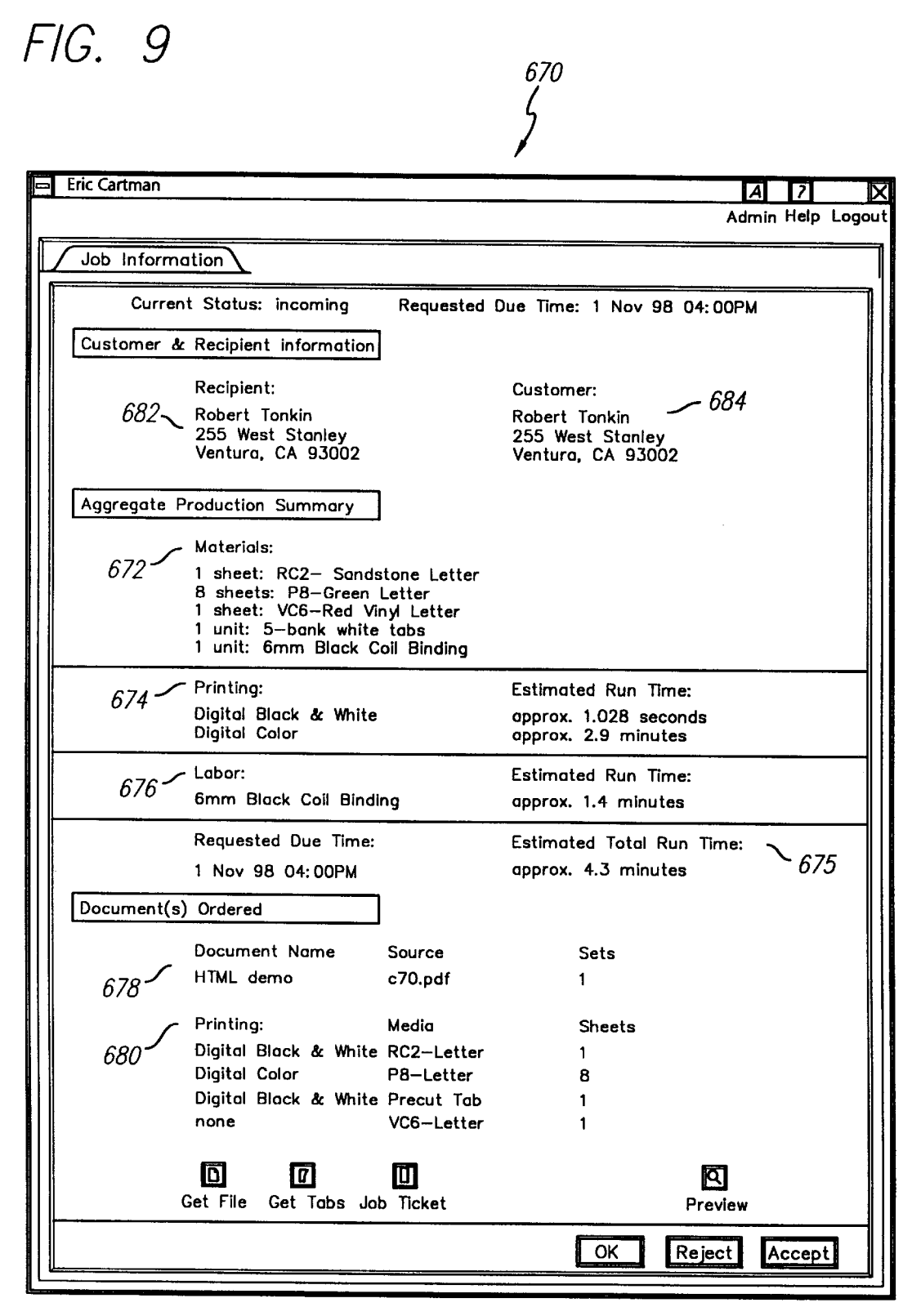

As noted briefly above, upon receipt of the order, processing facility 60 processes the order information in step 210 (shown in FIG. 3) so as to facilitate assembly of the document and also to facilitate routing of the order information. An example of this formatting is window 670, illustrated in FIG. 9. As shown in FIG. 9, in the present embodiment of the invention, the information is formatted to include a production summary which lists: (1) materials required 672 by stock number and description, (2) printing required 674 by type, with an estimated run time for each type of printing, and (3) labor required 676 with a description of each type of work and an estimate of the time required to complete each work item. The production summary also preferably includes a total estimated run time 675, and may optionally include an estimated price for each item and/or a total price for the work.

Also shown in FIG. 9, the formatted information further includes a document summary listing the source file name 678 and, in order of appearance in the document, a printing summary 680 including the type of printing, media on which to print and number of sheets for each printing job in the order request. It should be noted that the formatted information according to the invention may be arranged or presented in different ways and new summary information generated and added to the report so as to facilitate document production and routing.

In step 212 (shown in FIG. 3), the order information is automatically evaluated and routed to one of the production locations. Preferably, processing facility 60 has a stored database with information regarding the capabilities and geographic location of each of the production locations. In the preferred embodiment, geographic location is taken into account by comparing distances from the document production locations to the recipient's location. Furthermore, in certain embodiments of the invention, it might be desirable to estimate geographic distance based on zip code. Accordingly, the document order can be routed to the location nearest to the recipient's location that is appropriate for processing the order.

In this regard, it is noted that whether a location is appropriate for processing an order might merely mean whether the location is capable of producing the document, but more often will mean more than mere capability, such as indicating whether the location normally handles such work or can readily handle such work. For example, based on equipment levels, supply levels and/or staffing, each location might be rated as capable of handling jobs of a certain type up to a certain size, but not jobs of the same type larger than the specified size, even though the location is physically capable of handling such larger jobs.

Alternatively, the routing decision may be based on any combination of a capabilities factor and geographic distance to the recipient's location. In this case, the trade-off between capabilities and distance preferably is made so as to minimize total cost. For example, for certain large orders it may be preferable to route the order to a more distant production location that has faster equipment or the capability to handle larger volumes. For such orders, the added transportation time and cost might be offset by increased document production efficiency or efficiencies obtained from balancing work loads among various document production locations. However, for a smaller order, distance to the recipient might be the most important factor. In any event, it is preferable that the routing decision be made automatically according to a predetermined method.

In step 214 (shown in FIG. 3), an order confirmation is transmitted to the customer over the internet or whichever other communication system is used for communicating between the two. The confirmation might include, for example, a price quote and/or an estimated time of completion.

Upon completion of the above process steps, the document is assembled according to the document specification. Document assembly techniques are well known in the art and can be entirely manual, or partially or fully automated.

Conclusion

The systems and techniques of the present invention can overcome many of the problems associated with conventional document ordering. By providing a way for a user to preview an image of a document before ordering it, the invention an often eliminate unexpected surprises in the appearance of the final document. In addition, the person constructing the document can also view images of the document, if necessary, to obtain a sense of how the finished product is supposed to look, thereby further reducing the likelihood of errors or misunderstandings.

In addition, the present invention provides a reliable technique by which a document can be ordered electronically, thus obviating the need for the author to physically visit the document assembly location. This can have the effect of further increasing document ordering efficiency.

By including automatic verification of the document specification, the present invention also can avoid later delays in the document assembly process. Also, by automatically routing an order request based on distance to the recipient and location capabilities, the present invention often can achieve maximum efficiency in the overall document delivery system. The present invention can further increase efficiency by automatically formatting order information so as to facility routing and/or document assembly.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Therefore, it is intended that all such variations not departing from the spirit of the invention be considered as within the scope thereof as limited solely by the claims appended hereto.

For instance tasks are distributed between the processing facility 60 (server) and remote terminal (client) in a particular manner in the above embodiment. However, it should be understood that the tasks described above, particularly those relating to document specification and previewing, may instead be distributed in any other manner between the processing facility 60 and the remote terminal. Also, although a Java applet is utilized in the above described embodiment, any other platform independent or platform dependent computer executable code might be used instead at the remote terminal. Similarly, the Java applet might be eliminated entirely and most of the processing performed at the processing facility 60 (server) with the remote terminal merely running ordinary browser functions. It is also noted that, although images for all document views are generated at the outset in the above embodiment, each view might instead be generated on-the-fly as requested by a user. These and other design choices generally will be influenced by such factors as the current state of technology, capacity of the communication system used, and desired tradeoffs between speed and memory usage.

It should be understood that the present invention also relates to machine readable media on which are stored (encoded) program instructions for performing the methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

In the following claims, those elements which do not include the words "means for" are intended not to be interpreted under 35 U.S.C. § 112 ¶ 6.

What is claimed is:

1. A method to enable a user to preview a document, said method comprising:
    (a) providing a user interface;
    (b) inputting, via the user interface, information specifying an arrangement of components to assemble a document, the components including a binding type and at least one of: a printed page, a tab page, a blank page, a front cover, and a back cover;
    (c) obtaining digital images of at least some of the components specified by the information input in step (b);
    (d) generating an image of the document by combining the digital images of at least some of the components in a manner so as to simulate an appearance of the document were the document to be physically assembled according to the information input in step (b); and
    (e) causing the image of the document to be displayed.

2. A method according to claim 1, wherein the information input in step (b) specifies a printed page, includes a reference to a source file containing content to be printed on the printed page, and also includes a media type specification for the printed page.

3. A method according to claim 1, further comprising steps of:
    (f) estimating document thickness based on the information input in step (b); and
    (g) selecting a binding based on the binding type specified and based on the document thickness.

4. A method according to claim 1, wherein an object is stored for each component, and wherein each object specifies a digital image, as well as other attributes, of its corresponding component.

5. A method according to claim 1, wherein the image is generated in step (d) based upon stored relative position information and stored overlap information associated with the components.

6. A method according to claim 1, further comprising steps of verifying whether it is possible to create a document specified by the information input in step (b) and outputting an error message if it is not possible.

7. A method according to claim 1, further comprising a step of responding to a user command selecting a different portion of the document by obtaining and displaying a new image which simulates an appearance of said different portion of the document.

8. A method according to claim 1, further comprising a step of responding to an edit command after the document has been displayed, by allowing a user to modify at least some of the information input in step (b).

9. A method according to claim 1, further comprising a step of responding to a command to submit an order for the document by transmitting the information input in step (b) to a processing facility.

10. A method according to claim 9, wherein the information is transmitted via an internet connection.

11. A method to enable a user to preview a document, said method comprising:
    (a) providing a user interface;
    (b) inputting information, via the user interface, specifying a source file which contains content for a document;
    (c) inputting information, via the user interface, specifying an arrangement of components to assemble the document, the components including pages to be printed and a binding type;
    (d) inputting information, via the user interface, defining the pages to be printed, including information specifying content from the source file to be printed on said pages; and
    (e) generating and displaying an image of the document by combining digital images of at least some of the components, in a manner so as to simulate an appearance of the document were the document to be physically assembled according to the information input in steps (c) and (d).

12. A method according to claim 11, further comprising:
    (f) in response to a user command selecting a different portion of the document, obtaining and displaying a new image which simulates an appearance of said different portion of the document.

13. A method according to claim 11, wherein the information input in step (d) also includes a media type specification for the printed pages.

14. A method according to claim 13, wherein a digital image of a page to be printed is generated by combining image data for the content specified in the information input in step (d) with image data for the media type specified.

15. A method according to claim 11, wherein the information input in step (c) specifies a tab page and also specifies text to be included on a tab located on the tab page.

16. A method according to claim 11, wherein the information input in step (c) specifies a front cover and also specifies a media type for the front cover.

17. A method according to claim 11, wherein an object is stored for each component, and wherein each object specifies a digital image, as well as other attributes, of its corresponding component.

18. A method according to claim 11, wherein the image is generated in step (e) based upon stored relative position information associated with the components.

19. A method according to claim 11, further comprising steps of verifying whether it is possible to create a document specified by the information input in steps (c) and (d) and then outputting an error message if it is not possible.

20. A method according to claim 11, further comprising a step of responding to an edit command after the document has been displayed, by allowing a user to modify at least some of the information input in steps (b)–(d).

21. A method according to claim 20, further comprising a step of generating and displaying a new image of the document based on the modified information.

22. A method according to claim 11, further comprising a step of responding to a command to submit an order for the document by transmitting the information input in steps (c) and (d), together with the source file, to a processing facility.

23. A method according to claim 22, wherein the information is transmitted via an internet connection.

24. Computer-executable process steps stored on a computer readable medium, said process steps to enable a user to preview a document, said process steps comprising steps to:

(a) provide a user interface;

(b) input, via the user interface, information specifying an arrangement of components to assemble a document, the components including a binding type and at least one of: a printed page, a tab page, a blank page, a front cover, and a back cover;

(c) obtain digital images of at least some of the components specified by the information input in step (b);

(d) generate an image of a document by combining the digital images of at least some of the components in a manner so as to simulate an appearance of the document were the document to be physically assembled according to the information input in step (b); and (e) cause the image of the document to be displayed.

25. Computer-executable process steps according to claim 24, wherein the information input in step (b) specifies a printed page, includes a reference to a source file containing content to be printed on the printed page, and also includes a media type specification for the printed page.

26. Computer-executable process steps according to claim 24, further comprising steps of:

()f estimating document thickness based on the information input in step (b); and (g) selecting a binding based on the binding type specified and based on the document thickness.

27. Computer-executable process steps according to claim 24, wherein an object is stored for each component, and wherein each object specifies a digital image, as well as other attributes, of its corresponding component.

28. Computer-executable process steps according to claim 24, wherein the image is generated in step (d) based upon stored relative position information and stored overlap information associated with the components.

29. Computer-executable process steps according to claim 24, further comprising steps of verifying whether it is possible to create a document specified by the information input in step (b) and outputting an error message if it is not possible.

30. Computer executable process steps according to claim 24, further comprising a step of responding to a user command selecting a different portion of the document by obtaining and displaying a new image which simulates an appearance of said different portion of the document.

31. Computer-executable process steps according to claim 24, further comprising a step of responding to an edit command after the document has been displayed, by allowing a user to modify at least some of the information input in step (b).

32. Computer-executable process steps according to claim 24, further comprising a step of responding to a command to submit an order for the document by transmitting the information input in step (b) to a processing facility.

33. Computer-executable process steps stored on a computer readable medium, said process steps to enable a user to preview a document, said process steps comprising steps to:

(a) provide a user interface;

(b) input information, via the user interface, specifying a source file which contains content for a document;

(c) input information, via the user interface, specifying an arrangement of components to assemble the document, the components including pages to be printed and a binding type;

(d) input information, via the user interface, defining the pages to be printed, including information specifying content from the source file to be printed on said pages; and (e) generate and display an image of the document by combining digital images of at least some of the components, in a manner so as to simulate an appearance of the document were the document to be physically assembled according to the information Input in steps (c) and (d).

34. An apparatus to enable a user to preview a document, comprising:

a processor for executing stored program instruction steps; and a memory connected to the processor for storing the program instruction steps, wherein the program instruction steps include steps to:

(a) provide a user interface;

(b) input, via the user interface, information specifying an arrangement of components to assemble a document, the components including a binding type and at least one of: a printed page, a tab page, a blank page, a front cover, and a back cover;

(c) obtain digital images of at least some of the components specified by the information input in step (b);

(d) generate an image of the document by combining the digital images of at least some of the components in a manner so as to simulate an appearance of the document were the document to be physically assembled according to the information input in step (b); and (e) cause the image of the document to be displayed.

35. An apparatus to enable a user to preview a document, comprising:

a processor for executing stored program instruction steps; and a memory connected to the processor for storing the program instruction steps, wherein the program instruction steps include steps to:

(a) provide a user interface;

(b) input information, via the user interface, specifying a source file which contains content for a document;

(c) input information, via the user interface, specifying an arrangement of components to assemble the document, the components including pages to be printed and a binding type;

(d) input information, via the user interface, defining the pages to be printed, including information specifying content from the source file to be printed on said pages; and (e) generate and display an image of the document by combining digital images of at least some of the components, in a manner so as to simulate an appearance of the document were the document to be physically assembled according to the information input in steps (c) and (d).

* * * * *